United States Patent
Liang et al.

(10) Patent No.: US 6,316,854 B1
(45) Date of Patent: Nov. 13, 2001

(54) AUTOMATIC UP-AND-DOWN DISC CLAMPING APPARATUS WITH MAGNETS

(75) Inventors: Ruey-Lin Liang; Yu-Hsiu Chang, both of Changhua Hsien (TW)

(73) Assignee: Industrial Technology Research Institutes, Hsinchu (TW)

( * ) Notice: Subject to any disclaimer, the term of this patent is extended or adjusted under 35 U.S.C. 154(b) by 0 days.

(21) Appl. No.: 09/482,424

(22) Filed: Jan. 13, 2000

(30) Foreign Application Priority Data

Nov. 18, 1999 (TW) .................................... 88120151

(51) Int. Cl.⁷ .............................. H02K 7/00; G11B 23/00; G11B 33/02
(52) U.S. Cl. ..................... 310/67 R; 369/270; 369/75.2
(58) Field of Search ..................... 310/67 R, 66; 369/266, 270, 271, 75.2; 360/99.06, 99.07

(56) References Cited

U.S. PATENT DOCUMENTS

| | | | |
|---|---|---|---|
| 4,477,894 | * | 10/1984 | Clurman ................................. 369/270 |
| 4,510,592 | * | 4/1985 | Kanamaru et al. ................... 369/270 |
| 4,539,671 | * | 9/1985 | Higashihara ........................... 369/213 |
| 4,561,084 | * | 12/1985 | Satake et al. ......................... 369/75.2 |
| 4,730,299 | * | 3/1988 | Kamoshita et al. .................. 369/264 |
| 4,823,337 | * | 4/1989 | Van Zanten et al. ................ 369/270 |
| 4,951,277 | * | 8/1990 | Masunaga et al. ................... 369/270 |
| 5,001,700 | * | 3/1991 | Rowden et al. ...................... 369/270 |
| 5,388,094 | * | 2/1995 | Park ...................................... 369/270 |
| 5,668,792 | * | 9/1997 | Choi ...................................... 369/271 |
| 5,671,210 | * | 9/1997 | Goto ...................................... 369/271 |

* cited by examiner

Primary Examiner—Nestor Ramirez
Assistant Examiner—Dang Dinh Le
(74) Attorney, Agent, or Firm—Jiawei Huang; J. C. Patents

(57) ABSTRACT

A spindle motor is lifted up to an attachment position, and a yoke inside a disc clamp is then attracted by a circular ring magnet in a turntable on the spindle motor. When the spindle motor is lowered down, the magnetic conductive material is attracted by a circular ring magnetic on a chucking plate. Thus, the disc clamp is moved up-and-down automatically by means of magnetic attraction, and interference with a cartridge is prevented. By comparison with prior art disc clamping apparatus which utilizes a spring or lever mechanism, the present invention can reduce both an operating space and a number of components. Also, the complexities of design and assembly are reduced, and collisions between devices are avoided.

17 Claims, 3 Drawing Sheets

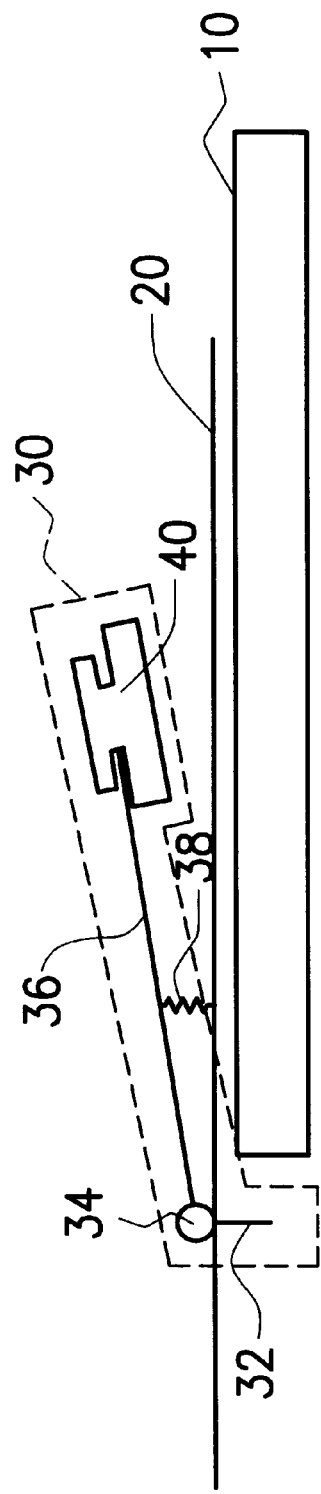
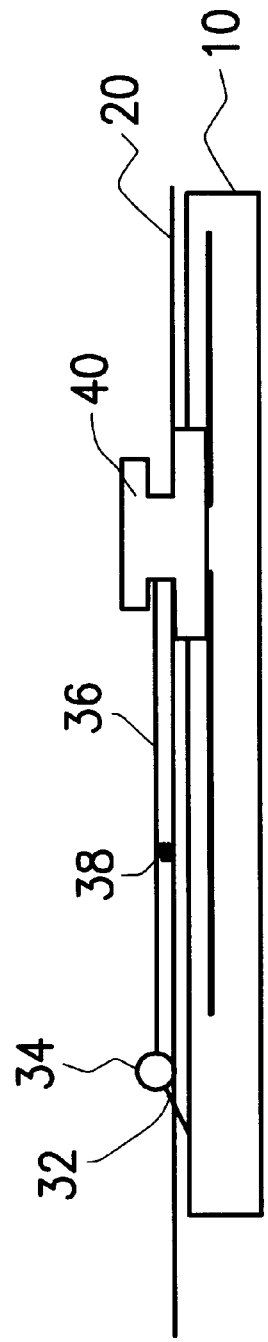
FIG. 1A (PRIOR ART)
FIG. 1B (PRIOR ART)

AUTOMATIC UP-AND-DOWN DISC CLAMPING APPARATUS WITH MAGNETS

CROSS-REFERENCE TO RELATED APPLICATION

This application claims the priority benefit of Taiwan application serial no. 88120151, filed Nov. 18, 1999.

BACKGROUND OF THE INVENTION

1. Field of the Invention

The present invention relates to a disc clamping apparatus. More particularly, the present invention relates to an automatic up-and-down disc clamping apparatus with magnets.

2. Description of the Prior Art

In 1997, the DVD Alliance published a DVD-RAM standard in which a disc with a cartridge is revealed. A thickness of the cartridge is about 8 mm. Interference between the cartridge and a disc clamp may occur while loading or ejecting the cartridge. Interference means that a position of the disc clamp is not high enough so that the disc clamp touches the cartridge during the loading or ejecting process. Damage to the cartridge may occur or data stored in the disc may even be lost.

Currently designs in disc clamping apparatus for disc players employ an elastic lever mechanism constructed in a chucking plate to lift up a disc clamp. Reference is made to FIGS. 1A and 1B, which illustrate schematic views of a prior art disc clamping apparatus and its operating movement. As shown in FIG. 1A, when a cartridge holder 10 of a disc player is moved in a loading state outside the disc player, an elastic lever mechanism 30 constructed in the chucking plate 20 begins to operate.

When a contact rod 32 of the elastic lever mechanism 30 is separated from the cartridge body 10, an elastic device 38 causes a lever rod 36 of the elastic lever mechanism 30 to rotate with a hinge point 34 as a pivot center such that a disc clamp 40 is lifted up. Therefore, interference between the disc clamp 40 and a cartridge is prevented.

Reference is made to FIG. 1B, in which the cartridge holder 10 is moved back into the disc player. When the cartridge holder 10 makes contact with the contact rod 32, the elastic device 38 is compressed. The lever rod 36 is rotated with the hinge point 34 as the pivot center such that the disc clamp 40 is lowered down and clamped onto a disc. Finally, a spindle motor (not shown) is lifted up. The disc is then supported by the spindle motor. At this moment, the disc is secured by the disc clamp 40 and the spindle motor. Rotation of the disc follows and data can be read or written on the rotating disc.

Unfortunately, the prior art elastic lever mechanism 30 has a lot of components. Its assembly is not easy. Moreover, the up-and-down motion of the elastic lever mechanism 30 requires a large operating space. All of these problems increase the complexity of a structural design for a disc player.

SUMMARY OF THE INVENTION

Accordingly, the present invention provides an automatic up-and-down disc clamping apparatus with magnets. A spindle motor is lifted up to an attachment position and a magnetic conductive material inside a disc clamp is then attracted by a circular ring magnet in a turntable on the spindle motor. When the spindle motor is lowered down, the magnetic conductive material is attracted by a circular ring magnet on a chucking plate. Thus, the disc clamp is moved up-and-down automatically, and interference with a cartridge or a disc is prevented.

The present invention provides an automatic up-and-down disc clamping apparatus with magnets, in which an operating space and the number of components are both reduced.

The present invention provides an automatic up-and-down disc clamping apparatus with magnets, in which the complexities of design and assembly are reduced, and collisions between devices can be avoided.

The present invention provides an automatic up-and-down disc clamping apparatus with magnets, which is described as follows.

A spindle motor has a shaft portion, wherein a turntable is fixed on top of the shaft portion such that the shaft portion is encased in a center of the turntable. The turntable is brought into rotation by the spindle motor. A disc is supported by the turntable when the spindle motor is lifted up to an attachment position. A first magnet is fixed to the turntable, and a locking plate has a surface facing the turntable on the spindle motor. A second magnet is fixed to the locking plate. A disc clamp, which has a magnetic conductive material within, is attached to the locking plate by an attraction of the second magnet. When the spindle motor is in the attachment position, the disc clamp is clamped onto the disc by an attraction of the first magnet.

The present invention provides an automatic up-and-down disc clamping apparatus with magnets, which is described as follows.

A spindle motor has a shaft portion, wherein a turntable is fixed on top of the shaft portion such that the shaft portion is encased in a center of the turntable. The turntable is brought into rotation by the spindle motor. A disc is supported by the turntable when the spindle motor is lifted up to an attachment position. A first magnet is fixed to the turntable. A chucking plate has a recess and the recess opening faces the turntable on the spindle motor. A second magnet is fixed to a bottom of the recess. A disc clamp, which has a magnetic conductive material within, is attached to the bottom of the recess by an attraction of the second magnet. When the spindle motor is in the attachment position, the disc clamp is clamped onto the disc by an attraction of the first magnet.

BRIEF DESCRIPTION OF THE DRAWINGS

The accompanying drawings are included to provide a further understanding of the present invention, and are incorporated in and constitute a part of this specification. The drawings illustrate preferred embodiments of the present invention and, together with the description, serve to explain the principles of the present invention. In the drawings, FIGS. 1A and 1B are schematic views of a prior art disc clamping apparatus and its operating movement;

DESCRIPTION OF THE PREFERRED EMBODIMENTS

Figure 2:
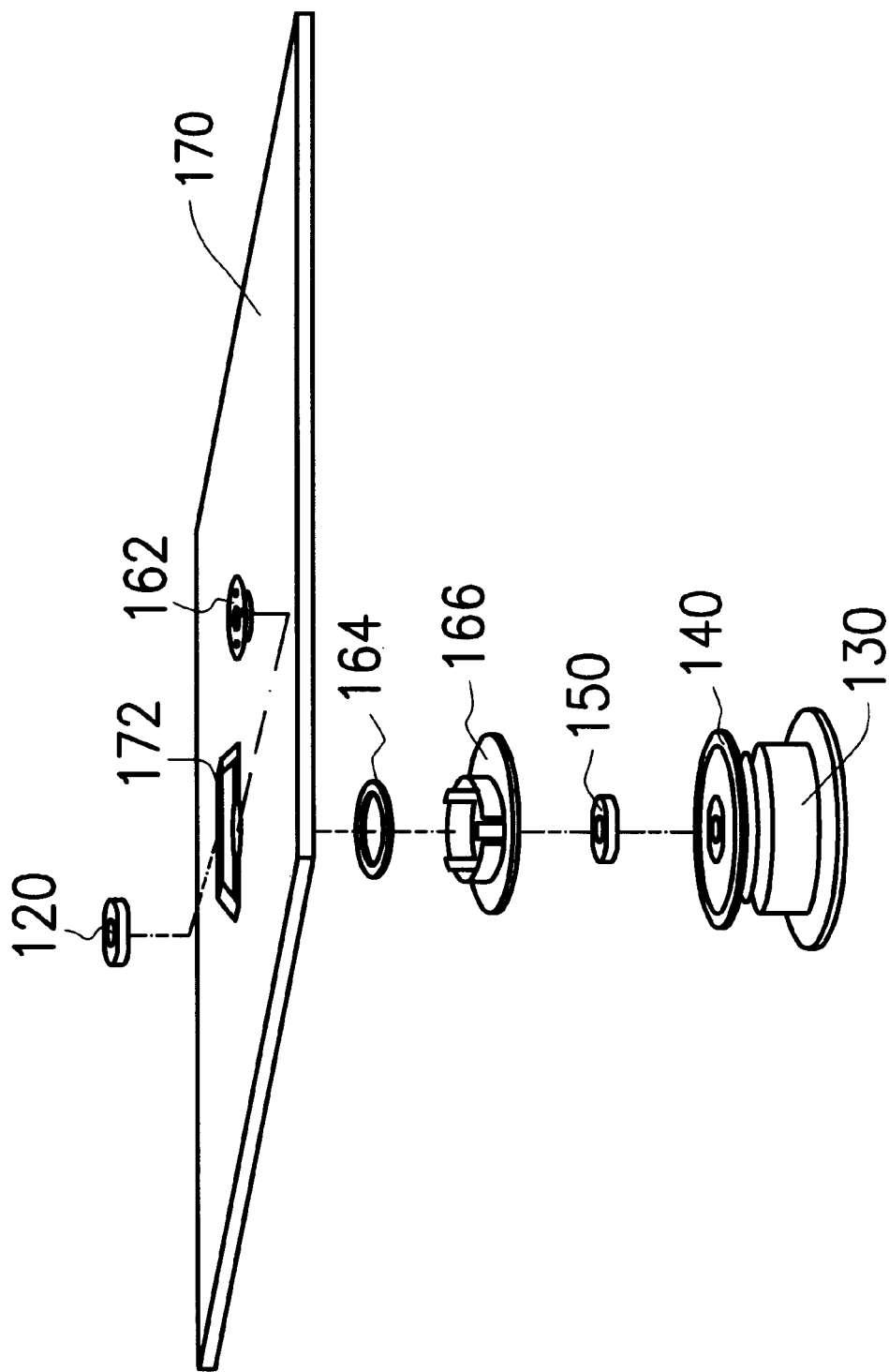
FIG. 2 is a schematic view showing components of an automatic up-and-down disc clamping apparatus with magnets in accordance with a preferred embodiment of the present invention.

Reference is made to FIG. 2, which illustrates a schematic view showing components of an automatic up-and-down disc clamping apparatus with magnets in accordance with a preferred embodiment of the present invention. The components include a spindle motor 130, a turntable 140, two circular ring magnets 120 and 150, an upper and lower portion of a disc clamp 162 and 166, respectively, a magnetic conductive material 164, and a chucking plate 170.

The spindle motor 130 is a mechanism for rotating a disc in a disc player. The rotation of the disc is achieved by encasing a shaft portion of the spindle motor 130 in a center of the turntable 140 such that when the spindle motor 130 is rotated, the turntable 140 is brought into a stable rotating motion by the spindle motor 130.

In order to prevent collisions of the rotating disc with other devices, the spindle motor 130 is lifted up to an attachment position when the disc is inserted into the disc player, and the disc is then supported by the turntable 140. This ensures that the disc does not collide with the other devices during the rotation.

The circular ring magnet 150 (a first magnet which is a uni-axial polar magnetized magnet) is mounted inside the turntable 140, and is employed to attract the disc clamp when the spindle motor 130 is lifted up to the attachment position.

A chucking plate 170 is placed above the spindle motor 130 (a locking plate). The chucking plate 170 has a recess 172 whose opening faces the turntable 140 on the spindle motor 130. The recess 172 is employed to receive the disc clamp so that interference between the disc or a cartridge and the disc clamp is avoided during an insertion process of the disc or the cartridge.

The other circular ring magnet 120, (a second magnet which is a uni-axial polar magnetized magnet,) is fixed to a bottom of the recess 172, and is employed to attract the disc clamp when the spindle motor 130 is not in the attachment position.

Figure 3:
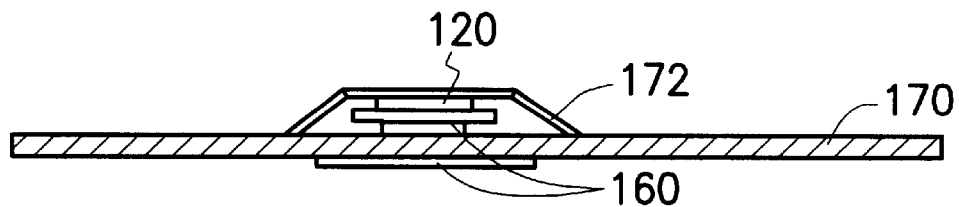
FIG. 3 is a schematic view showing an assembly of a disc clamp and a chucking plate for an automatic up-and-down disc clamping apparatus with magnets in accordance with a preferred embodiment of the present invention.

The disc clamp is described as follows. The disc clamp in accordance with a preferred embodiment of the present invention is constructed from the upper portion 162, the lower portion 166, and the magnetic conductive material 164 (the magnetic conductive material 164 is a yoke according to a preferred embodiment of the present invention). The upper portion 162 and the lower portion 166 are interlocked to each other, and are employed to limit a movement of the disc clamp only in an up-and-down motion through the chucking plate 170 and to prevent the disc clamp falling off from the chucking plate 170. The magnetic conductive material 164 is disposed and secured inside the disc clamp formed of the upper portion 162 and the lower portion 166 interlocking to each other. Reference is made to FIG. 3, which illustrates a schematic view showing an assembly of a disc clamp and a chucking plate for an automatic up-and-down disc clamping apparatus with magnets in accordance with a preferred embodiment of the present invention. It is noted that the disc clamp 160 is attached to the bottom of the recess 172 by the attraction of the circular magnet 120.

Figure 4:
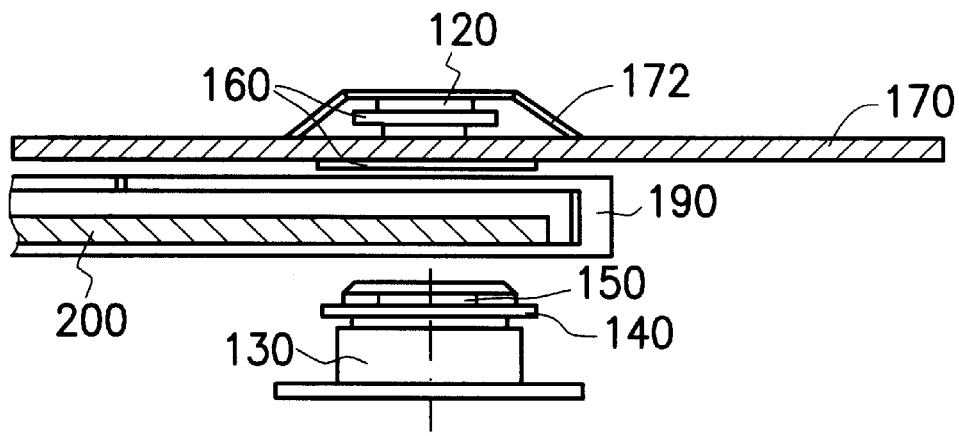
FIG. 4 is a schematic view showing a position of an automatic up-and-down disc clamping apparatus with magnets during a loading process of a cartridge in accordance with a preferred embodiment of the present invention.

Reference is made to FIG. 4, which illustrates a schematic view showing a position of an automatic up-and-down disc clamping apparatus with magnets during a loading process of a cartridge in accordance with a preferred embodiment of the present invention. When the spindle motor 130 is not lifted up to the attachment position, due to the presence of the magnetic conductive material 164 inside the disc clamp 160, the disc clamp 160 is attached to the bottom of the recess 172 by a magnetic attraction of the circular ring magnet 120 (the second magnet). As shown in FIG. 4, no interference between the disc clamp 160 and the cartridge 190, or the disc 200, occurs during the loading process of the cartridge 190.

Figure 5:
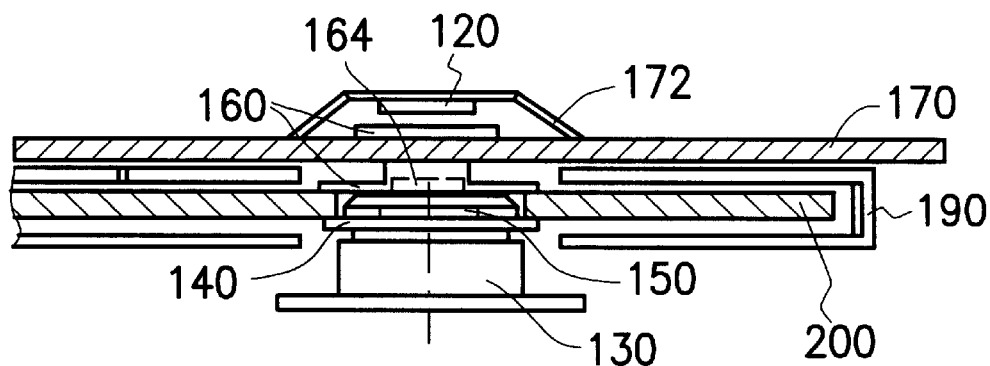
FIG. 5 is a schematic view showing a position of an automatic up-and-down disc clamping apparatus with magnets after a loading process of a cartridge in accordance with a preferred embodiment of the present invention.

Reference is made to FIG. 5, which illustrates a schematic view showing a lo position of an automatic up-and-down disc clamping apparatus with magnets after a loading process of a cartridge in accordance with a preferred embodiment of the present invention. After the insertion of the cartridge 190, the spindle motor 130 is lifted up and the disc 200 is supported by the turntable 140. When the spindle motor 130 is in the attachment position, the circular ring magnet 150 (the first magnet) is nearer to the magnetic conductive material 164 than the circular ring magnet 120. Hence, due to a magnetic attraction, the disc clamp 160 is attracted by the circular ring magnet 150 and clamped onto the disc 200.

Alternatively, the chucking plate 170 in accordance with a preferred embodiment of the present invention can be replaced by an inner surface of a case of a disc player. The circular ring magnet 120 (the second magnet) is secured to the inner surface of the case of the disc player. Thus, before the loading of the cartridge 190, the disc clamp 160 is attached to the inner surface of the plate of the disc player. This arrangement saves a production cost for the chucking plate.

Based on the foregoing, an advantage of an automatic up-and-down disc clamping apparatus with magnets according to the present invention is that when a spindle motor is lifted up to an attachment position a magnetic conductive material inside a disc clamp is attracted by a circular ring magnet in a turntable on the spindle motor. When the spindle motor is lowered down, the magnetic conductive material is attracted by a circular ring magnetic on a chucking plate. Thus, the disc clamp is moved up-and-down automatically, and interference with a cartridge or a disc is prevented.

Another advantage of an automatic up-and-down disc clamping apparatus with magnets according to the present invention is that an operating space and a number of components are both reduced.

Yet another advantage of an automatic up-and-down disc clamping apparatus with magnets according to the present invention is that complexities of design and assembly are reduced and collisions between devices can be avoided.

While the present invention has been disclosed with reference to the preferred embodiments described above, it is not intended to limit the present invention in any way. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic up-and-down disc clamping apparatus with magnets, comprising:

a spindle motor having a shaft portion, with a turntable fixed on top of the shaft portion such that the shaft is encased in a center of the turntable, the turntable is brought into a rotating motion by a rotation of the spindle motor, and a disc is supported by the turntable when the spindle motor is lifted up to an attachment position;

a first magnet fixed to the turntable;

a locking plate having a recess with a second magnet fixed to a bottom of the recess, and an opening of the recess facing the turntable on the spindle motor; and a disc clamp having a magnet conductive material within, with the disc clamp attached to the locking plate by an attraction of the second magnet, and clamped onto the disc by an attraction of the first magnet when the spindle motor is in the attachment position.

2. The disc clamping apparatus of claim 1, wherein the first magnet is shaped in a circular ring.

3. The disc clamping apparatus of claim 2, wherein the circular ring magnet is a uni-axial polar magnetized magnet.

4. The disc clamping apparatus of claim 1, wherein the second magnet is shaped in a circular ring.

5. The disc clamping apparatus of claim 4, wherein the circular ring magnet is a uni-axial polar magnetized magnet.

6. The disc clamping apparatus of claim 1, wherein the magnetic conductive material is a yoke.

7. The disc clamping apparatus of claim 1, wherein the locking plate is a chucking plate.

8. The disc clamping apparatus of claim 7, wherein the disc clamp is constructed from an upper portion, a lower portion, and the magnetic conductive material, with the upper and the lower portion employed to limit a movement of the disc clamp such that the disc clamp does not fall off the chucking plate.

9. The disc clamping apparatus of claim 1, wherein the locking plate is a surface of a case of a disc player.

10. An automatic up-and-down disc clamping apparatus with magnets, comprising:

a spindle motor having a shaft portion, with a turntable fixed on top of the shaft portion such that the shaft portion is encased in a center of the turntable, the turntable is brought into a rotating motion by a rotation of the spindle motor, and a disc is supported by the turntable when the spindle motor is lifted up to an attachment position;

a first magnet fixed to the turntable;

a chucking plate with a recess, and an opening of the recess facing the turntable on the spindle motor;

a second magnet fixed to a bottom of the recess; and a disc clamp having a magnetic conductive material within, with the disc clamp attached to the bottom of the recess by an attraction of the second magnet, and clamped onto the disc by an attraction of the first magnet when the spindle motor is in the attachment position.

11. The disc clamping apparatus of claim 10, wherein the first magnet is in a shape of a circular ring.

12. The disc clamping apparatus of claim 11, wherein the circular ring magnet is a uni-axial polar magnetized magnet.

13. The disc clamping apparatus of claim 10, wherein the second magnet is in a shape of a circular ring.

14. The disc clamping apparatus of claim 13, wherein the circular ring magnet is a uni-axial polar magnetized magnet.

15. The disc clamping apparatus of claim 10, wherein the magnetic conductive material is a yoke.

16. The disc clamping apparatus of claim 10, wherein the disc clamp is constructed from an upper portion, a lower portion, and the magnetic conductive material, with the upper and the lower portion employed to limit a movement of the disc clamp such that the disc clamp does not fall off the chucking plate.

17. An automatic up-and-down disc clamping apparatus with magnets, comprising:

a spindle motor having a shaft portion, with a turntable fixed on top of the shaft portion such that the shaft is encased in a center of the turntable, the turntable is brought into a rotating motion by a rotation of the spindle motor, and a disc is supported by the turntable when the spindle motor is lifted up to an attachment position;

a first magnet fixed to the turntable;

a locking plate with a surface facing the turntable on the spindle motor, wherein the locking plate is a surface of a case of a disc player; and a second magnet fixed to the locking plate; and a disc clamp having a magnet conductive material within, with the disc clamp attached to the locking plate by an attraction of the second magnet, and, when the spindle motor is in the attachment position, clamped onto the disc by an attraction of the first magnet.

\* \* \* \* \*